May 24, 1938.    B. R. JONES    2,118,245
TOY WHEELED VEHICLE
Filed June 6, 1936
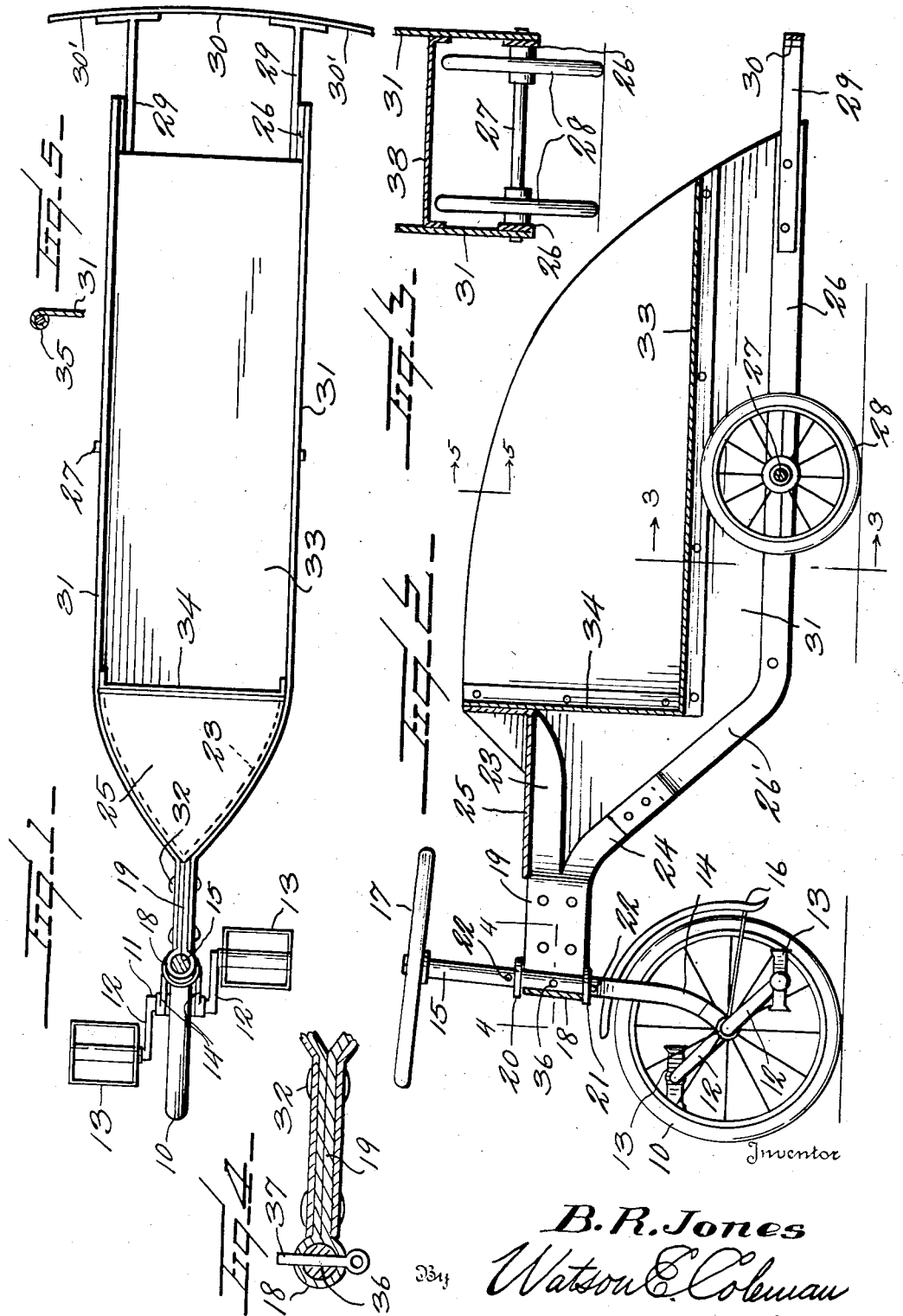

Patented May 24, 1938

2,118,245

UNITED STATES PATENT OFFICE 2,118,245

TOY WHEELED VEHICLE

Bennett Ray Jones, Perryopolis, Pa.

Application June 6, 1936, Serial No. 83,993

1 Claim. (Cl. 280—7.17)

This invention comprehends certain new and useful improvements in toy wheeled vehicles, and the primary object of my invention is a device of this character which I have called a three-in-one toy, in that it comprises a combination of velocipede or tricycle, truck, and wheelbarrow, being designed for the use and enjoyment of young children.

Another object of the invention is a device of this character, the parts of which are so arranged that they may be easily and cheaply manufactured and readily assembled and which will produce a comparatively light vehicle which at the same time will be sturdy and durable, and not liable to easily get out of order.

More specifically another object of the invention is a toy wheeled vehicle which may be easily propelled along by the rider as a velocipede and as a truck, and which may also be readily converted into a wheelbarrow by simple means which will hold the front axle or spindle from rotation, the body portion of the vehicle being provided at its rear with a transversely extending bar which serves the double purpose of a bumper when the device is used as a velocipede and truck and as a handle bar when the body portion is raised and the device is trundled along on its front wheel alone to form a wheelbarrow.

With these and other objects in view, as will more fully appear as the description proceeds, reference is to be had to the following detailed description and accompanying drawing in which—

Figure 1 is a plan view of my toy wheeled vehicle.

Fig. 2 is a longitudinal sectional view thereof.

Figs. 3 and 4 are transverse detail sectional views on the lines 3—3 and 4—4 of Fig. 2.

Fig. 5 is a detail fragmentary view on the line 5—5 of Fig. 2.

Referring to the drawing the numeral 10 designates the front wheel of my combination toy vehicle which wheel may be equipped with a solid or pneumatic tire and which may be of the disc type or equipped with wooden spokes or wire spokes, which latter are shown in the present instance. The wheel 10 is mounted upon an axle 11 which is provided with cranks 12 carrying treadles or pedals 13, and the wheel and its axle are mounted within a fork 14 which is formed at the lower end of a substantially vertical spindle 15. Preferably the wheel is equipped with a dust and mud guard, designated 16.

The spindle 15 is provided at its upper end with a hand wheel 17 which manifestly may be a handle bar if preferred, and the spindle is mounted for rotation about a substantially vertical axis in a collar 18 formed at the forward end of a preferably metallic bracket 19, which will be hereinafter more specifically described.

To provide for the holding of the spindle 15 properly in its bearings in the bracket 19, I provide washers 20 and 21 held in place by cross pins 22, the washers bearing upon the upper and lower surfaces of the bracket 19 at the collar 18 thereof.

The preferably metallic bracket 19 is in the present instance doubled upon itself to form the collar 18 as hereinbefore mentioned, and the two side members of the bracket engage each other for a portion of their length, as best illustrated in Fig. 4, and then diverge rearwardly to form upper and lower forked arms, designated 23 and 24 respectively, the arms 23 extending substantially horizontal to support a seat 25 while the arms 24 extend downward and rearward and are bolted or riveted to the upwardly and forwardly extending portions 26' of side bars 26 which extend rearward and in substantially parallel relation to each other, as indicated by Figs. 2 and 3, the rear axle 27 being mounted in said bars 26 and having the two rear ground wheels 28 mounted thereon.

Extending rearward from the rear ends of the bars 26 are the laterally spaced and longitudinally extending arms 29, to the rear ends of which are secured in any desired way, the transversely extending and preferably somewhat bowed bar 30, said bar 30 serving as a bumper for the rear of the vehicle when it is used as a velocipede and truck and also as a handle bar for the device when the body portion is raised from the floor or ground and the device is used as a wheelbarrow, as will be hereinafter more fully described.

To produce the body of the truck I preferably use side plates 31 which are secured to the side bars 26 in any desired way and which are so shaped as to overlap and be riveted or otherwise secured at their forward ends to the bracket 19, as best illustrated at 32, and the body is further formed with a bottom plate 33 riveted or otherwise secured between the side plates 31 and with a front plate or wall 34 riveted or otherwise secured in place, as clearly illustrated in Fig. 2 of the drawing. Preferably the side plates 31 are rolled along their upper edges to strengthen them, as best illustrated at 35 in Fig. 5.

As clearly illustrated in the drawing it is to be noted that the body hereinbefore described, comprises a bottom, a front wall and two side walls comprising the plates 31, the upper edges of which slope downward and rearward, and that the body has no rear wall at all but is entirely open at the rear whereby a simulation of the standard wheelbarrow body is produced.

In order that the device may be used as a wheelbarrow, I provide the spindle 15 in that portion thereof which is bounded by the collar 18 of the bracket 19, with a transversely extending aperture 36, and a pin 37 is designed to extend through this aperture and through corresponding registering openings in the collar 18 so as to prevent the spindle from rotation and hold the wheel 10 in proper alinement so that when the child lifts the device at the rear end by grasping the hand-holds 30' formed by the projecting ends of the transverse bar 30, the rear wheels 28 will be raised from the floor or ground and the whole toy may then be trundled on the single front wheel 10 and used in a manifest manner as a wheelbarrow.

From the foregoing description in connection with the accompanying drawing, it will be seen that I have provided a very simple three-in-one toy comprising the combination of a velocipede or tricycle, a truck, and a wheelbarrow. When the device is used as a tricycle and truck, the child resting upon the seat 25 and grasping the steering wheel 17, can propel the vehicle by means of the pedals 13 in an obvious manner, and if desired the body portion of the vehicle may serve as a truck to hold another child or children, or sand or the like, or whatever may strike the fancy of the child operator, and when the child desires to use the device as a wheelbarrow, the pin 37 is inserted through the spindle 15, as hereinbefore specifically described, the child then grasping the hand-holds 30' of the combined bumper and bar 30, raising the entire body and the ground wheels 28 from the ground and trundling the device along supported solely on the front wheel 10.

I claim:

A device of the character described, comprising a front ground wheel, an axle therefor, a spindle mounted on said axle, a truck body provided at its forward end with a bracket formed with a collar in which said spindle is held for rotation, said bracket being formed at its rear end with rearwardly diverging upper and lower members, a seat supported upon said upper members, body frame bars disposed in laterally spaced relation to each other and provided with forwardly and upwardly extending forward ends connected to the downwardly extending arms of the bracket, a rear axle mounted in said frame bars, rear wheels carrying said axle, side plates connected to said frame bars, the body being provided with a front wall and a bottom plate secured between and to said side plates, bars extending rearward from the frame bars at the rear end of the latter, and a transversely extending bumper bar carried by the last named bars, as and for the purpose set forth.

BENNETT RAY JONES.